United States Patent

Umezawa et al.

[11] Patent Number: 6,095,602
[45] Date of Patent: Aug. 1, 2000

[54] AUTOMOTIVE SEAT WITH SIDE AIR BAG DEVICE

[75] Inventors: Fumio Umezawa, Tochigi-ken; Takashi Aoki; Hidetoshi Utsumi, both of Saitama, all of Japan

[73] Assignees: TS Tech Co., Ltd.; Honda Giken Kogyo Kabushiki Kaisha, both of Japan

[21] Appl. No.: 09/179,010

[22] Filed: Oct. 26, 1998

[30] Foreign Application Priority Data

Oct. 30, 1997 [JP] Japan .................................. 9-314344

[51] Int. Cl.[7] .................................................. B60N 2/42
[52] U.S. Cl. .............................. 297/216.1; 297/216.13; 280/730.2
[58] Field of Search .......................... 297/216.1, 216.13, 297/218.1, 218.2, 218.3, 218.5; 280/730.2

[56] References Cited

U.S. PATENT DOCUMENTS

| | | | |
|---|---|---|---|
| 5,498,030 | 3/1996 | Hill et al. .......................... | 280/730.2 X |
| 5,601,332 | 2/1997 | Shultz et al. ...................... | 297/216.13 |
| 5,651,582 | 7/1997 | Nakano ............................. | 297/216.13 |
| 5,678,853 | 10/1997 | Maly ................................. | 280/730.2 |
| 5,749,597 | 5/1998 | Saderholm ........................ | 280/730.2 X |
| 5,810,389 | 9/1998 | Yamaji et al. ..................... | 280/730.2 |
| 5,816,610 | 10/1998 | Higashiura et al. ............... | 297/216.13 X |
| 5,845,932 | 12/1998 | Kimura et al. .................... | 280/730.2 |
| 5,863,063 | 1/1999 | Harrell ............................... | 280/730.2 |
| 5,893,579 | 4/1999 | Kimura et al. .................... | 297/216.13 X |
| 5,927,749 | 7/1999 | Homier et al. .................... | 280/730.2 |
| 6,003,938 | 12/1999 | Lachat et al. ..................... | 297/216.13 |

FOREIGN PATENT DOCUMENTS

| | | |
|---|---|---|
| 8216820 | 8/1996 | Japan . |
| 939711 | 2/1997 | Japan . |
| 971204 | 3/1997 | Japan . |
| 971205 | 3/1997 | Japan . |
| 976868 | 3/1997 | Japan . |
| 9123860 | 5/1997 | Japan . |

Primary Examiner—Jose V. Chen
Assistant Examiner—Rodney B. White
Attorney, Agent, or Firm—Dann, Dorfman, Herrell and Skillman, P.C.

[57] ABSTRACT

To break the trim cover 2 effectively and positively for instantaneous emerging of the inflated and expanded air bag from inside the seat, less-elongation stay cloths 7 and 8 each having two parallel sides of different lengths are provided in a region over both the front side and lateral trim cover portions 2a and 2b where the air bag is to be inflated and expanded, the stay cloths extending from the seam line 2c, or break line 3, along which the trim cover 2 is to be broken when the air bag is inflated and expanded, the front side and lateral portions 2a and 2b, respectively, of the trim cover 2, and the stay cloths 7 and 8 are positioned on the inner surfaces of the front side and lateral portions 2a and 2b of the trim cover 2, respectively, with their shorter sides thereof aligned with the respective seam-line ends of the front side and lateral trim cover portions 2a and 2b and registered with each other, and sewn at the shorter sides thereof together with the ends of the front side and lateral trim cover portions 2a and 2b, while being joined, at the longer sides thereof, to the seat back frame 4, so that the stay cloths 7 and 8 are kept tensioned on the inner surface of the trim cover 2.

9 Claims, 7 Drawing Sheets

AUTOMOTIVE SEAT WITH SIDE AIR BAG DEVICE

BACKGROUND OF THE INVENTION

1. Field of the Invention

The present invention relates to an improved automotive seat having a side air bag device disposed therein at one side of a seat back frame thereof and including an inflator and an air bag inflatable and expandable out of the seat when supplied with an output pressure from the inflator, and in which a trim cover comprises a central portion and a front side portion and lateral portion on either side of the central portion, those of the front side and lateral trim cover portions which cover together the air bag device being sewn on each other along their neighboring ends to form a seam line, or break line, along which the trim cover is to be broken when the air bag is inflated and expanded.

2. Description of the Prior Art

In a conventional automotive seat incorporating a side air bag device, a sewing thread having a normal strength is used to sew other portions of a trim cover than the neighboring ends of front side and lateral portions covering together the side air bag device while a weaker sewing thread is used to sew on each other the neighboring end portions of the front side and lateral trim cover portions over the air bag device to form a seam line, or break line, along which the trim cover is to be broken when applied with an expansion pressure of the air bag inflated with an output pressure from an inflator. When the air bag is inflated and expanded, the weaker thread used to thread the seam line can easily be cut for the air bag to instantly burst out from the seat inside (as disclosed in the Japanese patent application laid open as a Provisional Publication No. 216820/96, for example).

As mentioned above, the sewing thread used to sew the seam line, or break line, of the trim cover should be easy to cut when the trim cover is applied with the expansion pressure of the inflated air bag. However, the sewing thread should be strong enough to withstand a pressure applied to the trim cover during normal use of the seat. Also, since the trim cover will be elongated at least by nature when pushed outwardly by the inflated air bag, the stress caused by the inflation of the air bag cannot be well concentrated to the seam line, or break line, of the trim cover the moment the air bag is inflated and expanded. If the inflator is set to provide a low output for a soft inflation of the air bag, the trim cover cannot be effectively broken along the break line.

To concentrate the expansion pressure of an air bag to the seam line, or break line, of a trim cover, automotive seats have been proposed in which there is provided on the inner surface of a lateral portion of a trim cover a stay cloth made of a material which is less elongated and one end of which is sewn together with the seam line, or break line, of the trim cover (as disclosed in the Japanese patent applications laid open as Provisional Publication Nos. 71204/'97, 71205/'97 and 123860/'97, for example).

In these conventional seats, however, the stay cloth reinforces only one of, the lateral one, and front side portions of the trim cover, on which the stay cloth extends from the break line. Therefore, the other of the lateral and front side portions of the trim cover which is not reinforced by the stay cloth, cannot be restrained from being elongated when applied with the expansion pressure of the inflated air bag. This is not sufficient enough to instantly concentrate the air bag inflation-caused stress to the break line of the trim cover for quick breakage of a part of the thread used to sew the seam line.

Also, since the air bag is inflated only along the other of the front side and lateral portions of the trim cover which is not reinforced by the stay cloth, the air bag cannot be inflated evenly in a predetermined direction.

In addition, automotive seats with a side air bag device have been proposed which uses, on the inner surface of a front side portion of a trim cover, a stay cloth sewn at one end thereof on an end of the front side portion of the trim cover on which the stray cloth extends from the break line of the trim cover (as disclosed in the Japanese patent applications laid open as Provisional Publication Nos. 39711/'97 and 76868/97', for example). In these conventional automotive seats, however, since only one of the front side and lateral portions of the trim cover over the air bag device is reinforced by the stay cloth, the other of the front side and lateral portions of the trim cover not reinforced by the stay cloth cannot be restrained from being elongated when applied with the expansion pressure of the inflated air bag.

SUMMARY OF THE INVENTION

Accordingly, the present invention has an object to overcome the above-mentioned drawbacks of the prior art by providing an automotive seat with a side air bag, and in which an expansion pressure of an inflated air bag is instantly concentrated to a predetermined limited portion of a seam line, or break line, of a trim cover to which stay cloths are also joined, to thereby quickly cut threads used to sew the seam line, or break line, along which the trim cover is to be broken, so that even with a low inflator output pressure, the trim cover can be broken positively along the break line and thus the air bag can be inflated evenly in a predetermined direction.

Also the present invention has an object to provided an automotive seat provided with a side air bag, employing stay cloths and which is easy to assemble as a whole.

According to the present invention, there is provided, as set forth hereinbelow, an automotive seat, wherein:

less-elongation stay cloths each having two parallel sides of different lengths are provided in a region over both the front side and lateral trim cover portions where the air bag is to be inflated and expanded, the stay cloths extending from the seam line, or break line, along which the trim cover is to be broken when the air bag is inflated and expanded, on the inner surfaces of the front side and lateral portions, respectively, of the trim cover; and the stay cloths are positioned on the respective inner surfaces of the front side and lateral portions of the trim cover, with their shorter sides thereof aligned with the seam-line ends of the front side and lateral trim cover portions, respectively, and registered with each other, and sewn at the shorter sides thereof together with the ends of the front side and lateral trim cover portions, while being joined, at the longer sides thereof, to the seat back frame, so that the stay cloths are kept tensioned on the inner surface of the trim cover.

According to the present invention, there is also provided, as set forth hereinbelow, an automotive seat, wherein the stay cloths are provided integrally with the trim cover by sewing or laminating them to the inner surface of the trim cover.

BRIEF DESCRIPTION OF THE DRAWINGS

These objects and other objects, features, aspects and advantages of the present invention will become more apparent from the following detailed description of the present invention when taken in conjunction with the accompanying drawings, in which.

DETAILED DESCRIPTION OF THE PREFERRED EMBODIMENTS

Figure 1:
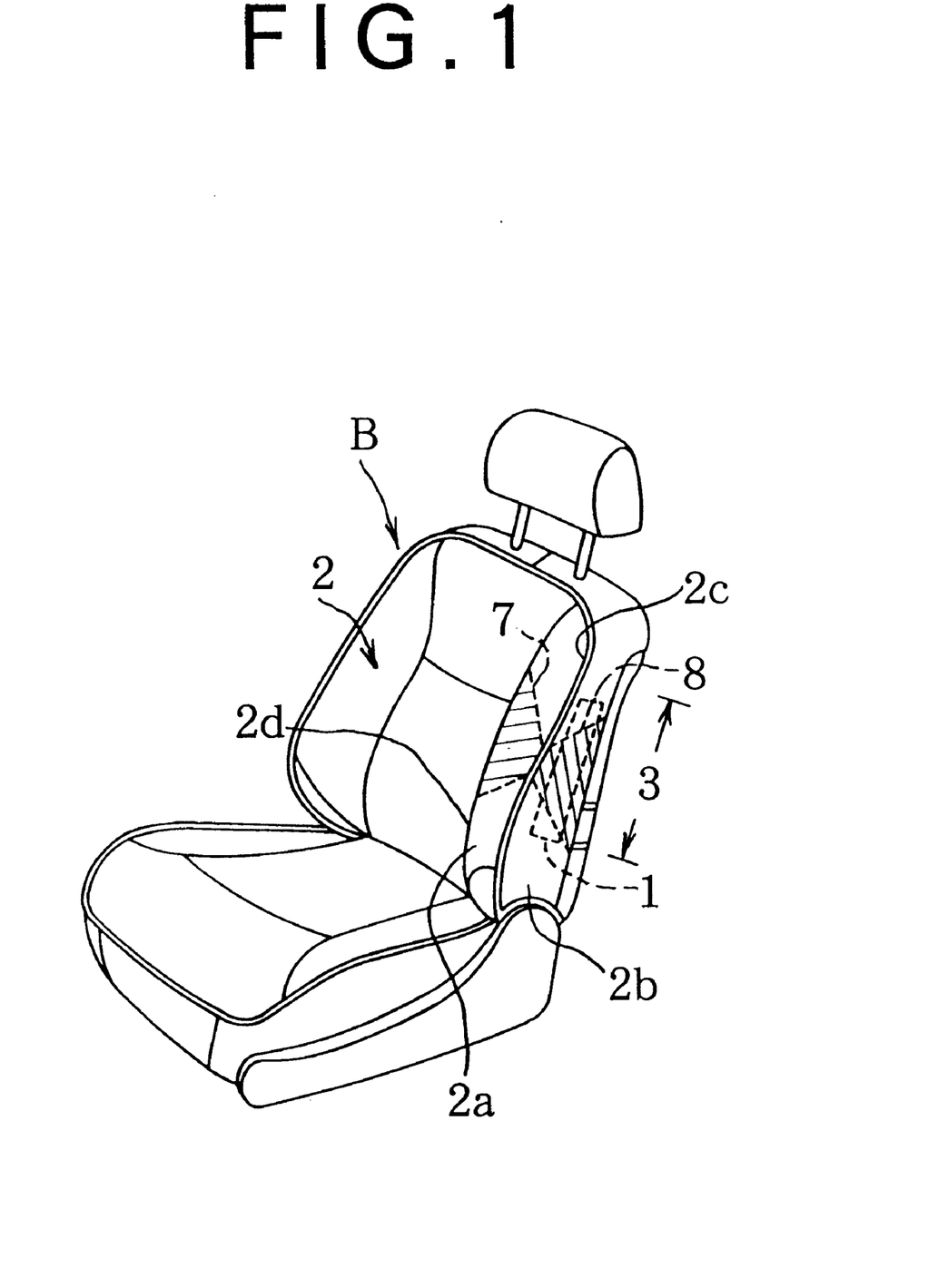
FIG. 1 is a perspective view of a whole automotive seat provided with a side air bag device according to the present invention.

Referring now to FIG. 1, there is illustrated an assistant seat, by way of example, according to the present invention. The assistant seat incorporates an air bag device 1 vertically disposed in the right portion of a seat back B as viewed from the front of a car in which the seat is installed on board. In this seat, the seat back B is covered with a trim cover 2 comprising, in addition to a central portion, a front side portion 2a and a lateral portion 2b both extending over the air bag device 1 (covering together a bulged side portion of the back pad, if applied, in case of a bucket seat). These front side and lateral portions 2a and 2b are sewn on each other along the vertical ends thereof to form a seam line 2c. This seam line 2c serves as a break line 3 along which the trim cover 2 is to be broken when the air bag is inflated and expanded.

Figure 2:
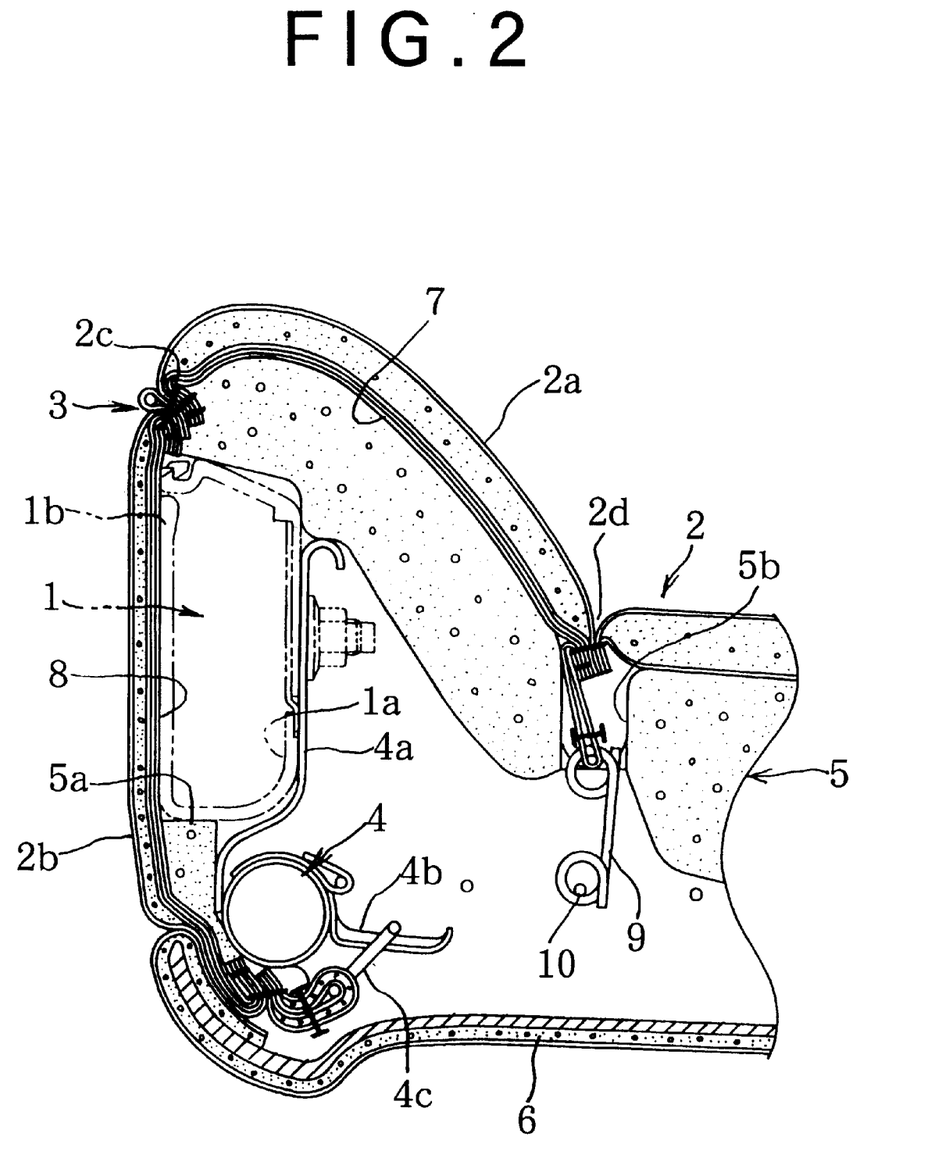
FIG. 2 is a fragmentary sectional view, enlarged in scale, of the seat back of an embodiment of the automotive seat according to the present invention.
Figure 3:
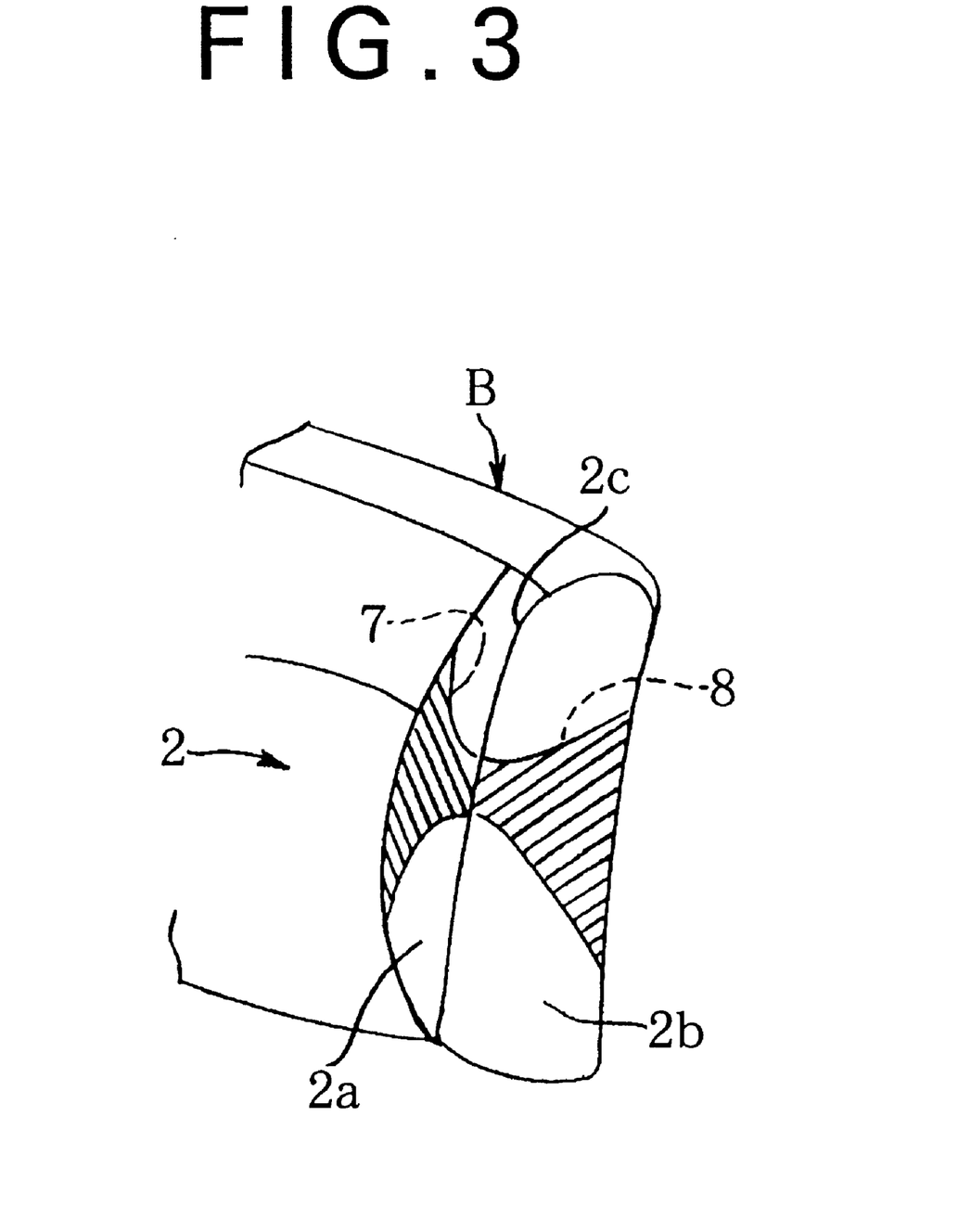
FIG. 3 is an explanatory drawing showing the action of the stay cloths at the initial inflation of the air bag in the automotive seat.

The air bag device 1 is composed of an air bag module including an inflator and air bag, and an impact sensor which is to be installed on the car body. These elements of the air bag module are not specifically illustrated herein. As shown in FIG. 2, the air bag device 1 comprises an air bag case 1a housing the air bag and inflator therein, and a case lid 1b hinged to the air bag case 1a and which can be opened when applied with the expansion pressure of the inflated air bag. The air bag case 1a is installed to a side plate 4a of a seat back frame 4. Namely, this air bag device 1 is of an encased type.

Alternatively of this encased type air bag device, an air bag module including an inflator and air bag may be installed directly to the side plate 4a of the seat back frame 4 and the air bag be disposed facing an opening 5a of a back pad 5 of the seat to be inflatable and expandable out of the seat in an emergency.

The trim cover 2 may be made of a wadding cover formed from three different materials, laminated one on another, including a single material or covering material such as a natural leather, synthetic leather, fabric, a wadding material and a lining material. The trim cover 2 is provided over the seat back B having a bulged portion on either side thereof.

More particularly, the trim cover 2 consists of a central portion, and two front side and lateral portions 2a and 2b on either side of the central portion, all sewn on each other along their neighboring ends. In either horizontal direction, the central portion is followed by the front side portion 2a which is further followed by the lateral portion 2b which extends to the back of the seat. The front side and lateral portions 2a and 2b are sewn on each other along their neighboring ends and thus cover together the bulged portion on either side of the seat back B. In case of a seat having a back cover 6 as shown in FIG. 2, the front side and lateral portions 2a and 2b are sewn on each other to form the trim cover 2 in the form of a bag open at the back thereof. For a seat without such a back cover 6, the trim cover 2 is formed like a bag open at the bottom thereof.

For forming the trim cover 2, a No. 8 thread or so capable of withstanding a pressure applied during normal use of the seat may be used as upper and lower threads to sew the front side and lateral portions 2a and 2b on each other by a sewing machine to form the above-mentioned bag-shaped trim cover. Alternatively, the cover portions other than the front side and lateral portions 2a and 2b over the air bag device may be sewn with a No. 8 thread or so while the front side and lateral portions 2a and 2b are sewn on each other with a No. 8 thread or so as one of the upper and lower threads and a No. 20 thread or so as the other thread to sew the seam line 2c that is the break line 3 for the trim cover 2. Thus, the trim cover 2 can withstand a pressure applied during normal use of the seat, and also can readily be broken along the seam line 2c, or break line 3, when the air bag is inflated and expanded in an emergency. As will be described later, the threads in the seam line 2c that is the break line 3 can be cut the moment the trim cover 2 is applied with the expansion pressure of the inflated air bag.

On the inner surface of the trim cover 2, there are provided stay cloths 7 and 8 extending from the seam line 2c, or break line 3, to the other ends of the front side and lateral portions 2a and 2b, respectively, of the trim cover 2 and over a region where the air bag is to be inflated and expanded. Each of the stay cloths 7 and 8 has a generally trapezoidal shape having two parallel sides of different lengths. The stay cloths 7 and 8 are made of a material which will be less elongated even when applied with the expansion pressure of the inflated air bag, such as polyester nonwoven fabric, cotton or the like. The stay cloths 7 and 8 can be provided integrally with the cover 2 by sewing or laminating them to the inner surfaces of the front side and lateral portions 2a and 2b.

As shown in FIG. 1, the stay cloths 7 and 8 are positioned on the inner surfaces of the front side and lateral portions 2a and 2b, respectively, of the trim cover 2 with their shorter sides thereof aligned with the respective seam-line ends of the front side and lateral portions 2a and 2b and registered with each other. They are sewn together with the neighboring ends of the front side and lateral portions 2a and 2b to form the seam line 2c. At this time, the stay cloths 7 and 8 are sewn along the predetermined limited portion of the seam line 2c. The predetermined limited portion may generally correspond to the location of the case lid 1b of the air bag case 1a or to the middle of the vertical length of the air bag. The longer side of the trapezoid of the stay cloth 7 is sewn on a seat suspension portion 2d of the trim cover 2. In a suspension space 5b of the back pad 5, there is provided a suspension bag or cloth also sewn on the seat suspension portion 2d. The seat suspension portion 2d is connected to a back spring 10 by means of the suspension bag and a suspension wire 9 hooked on the back spring 10. This will be seen from FIG. 2. The longer side of the stay cloth 8 is sewn on the end of the lateral portion 2b and connected to a retainer 4b of the seat back frame 4 by means of a wire 4c.

For a seat without the back board (not shown), the shorter sides of the stay cloths 7 and 8 are sewn together with the ends of the front side and lateral portions 2a and 2b as shown in FIG. 2 and the longer side of the stay cloth 8 may be sewn on the ends of the lateral portion 2b of the trim cover 2 and the back board and secured to the retainer 4b of the seat back frame 4 by means of the wire 4c.

In any of the above-mentioned seats, the stay cloths 7 and 8 can be securely retained at their respective ends not to disengage or elongate when applied with the expansion pressure of the inflated air bag, and thus tensioned over both the front side and lateral trim cover portions 2a and 2b, respectively.

In the automotive seat having been described in the foregoing, when the shock sensor provided on the car body is activated with a heavy shock, it outputs a signal to the inflator which in turn will provide an output pressure to inflate and expand the air bag. In case the air bag device 1 is of the encased type, the case lid 1b is pressed by the inflated air bag to open. The expansion pressure of the inflated air bag acts on the wide portion of the stay cloth 8 located by the side of the case lid 1b. Since the shorter side of the stay cloth 7 is sewn on the ends of the front side and lateral portions 2a and 2b, and thus, on the short side of the stay cloth 8 at the predetermined limited portion of the seam line, the stress of the stay cloth 8 applied at the wide portion thereof with the expansion pressure of the inflated air bag will be conveyed to the stay cloth 7 via the short side of the stay cloth 8.

Figure 4:
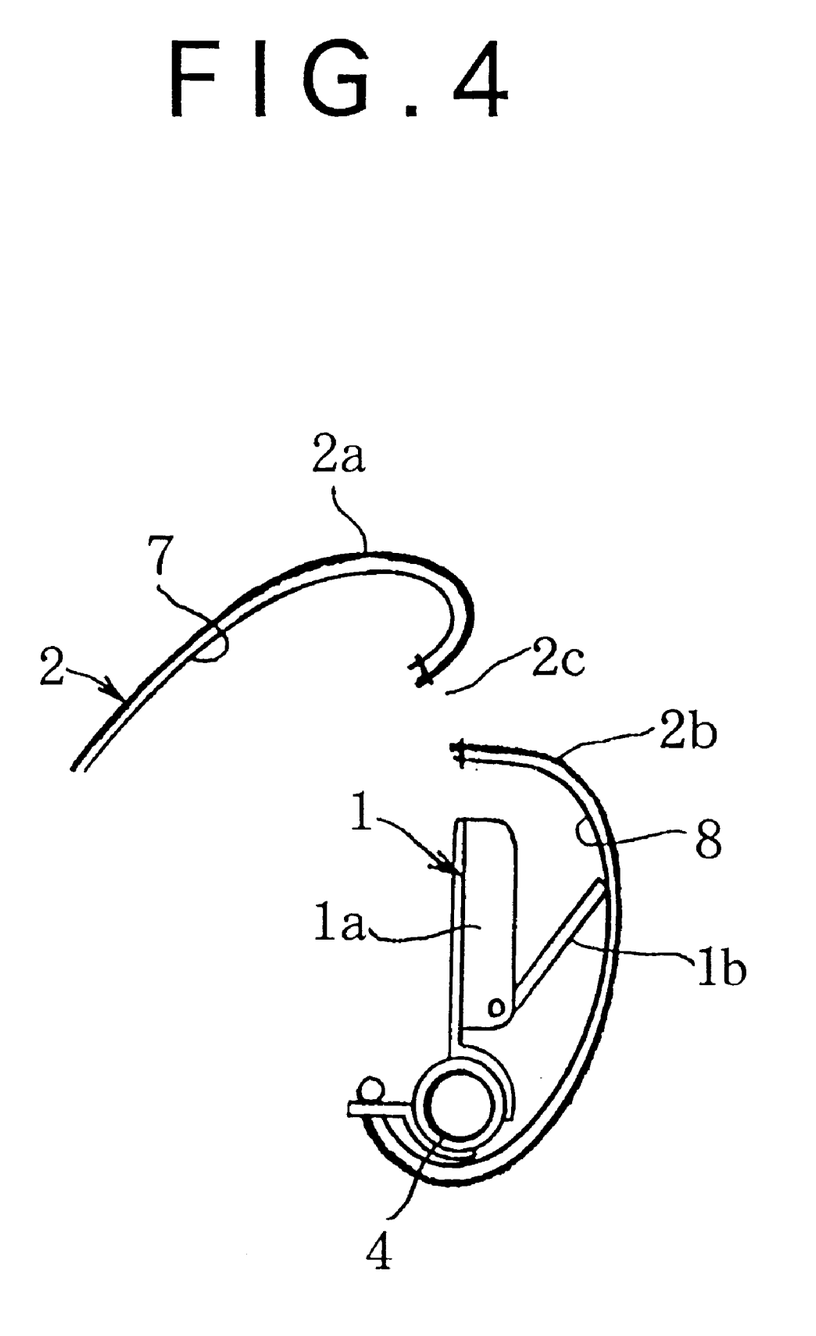
FIG. 4 is an explanatory drawing showing the initial breakage of the sewing string at the inflation of the air bag in the automotive seat.

As previously mentioned, the stay cloths 7 and 8 are made of a material which will be less elongated even when applied with the stress, they pull each other to concentrate the air bag inflation-caused stress to the seam line and thus strongly pull the sewing threads in the seam line in opposite directions. The case lid 1b presses the wide portion of the stay cloth 8 having the trapezoidal shape and thus the air bag inflation-caused stress given to the wide area of the stay cloth 8 is conveyed along the oblique sides of the stay cloth 8 for concentration to the shorter side of the stay cloth 8. Thus, the sewing threads in the seam line 2c, or break line 3, are pulled strongly in opposite directions by the stay cloths 7 and 8, and instantly cut in the seam line 2c as shown in FIG. 4.

Figure 5:
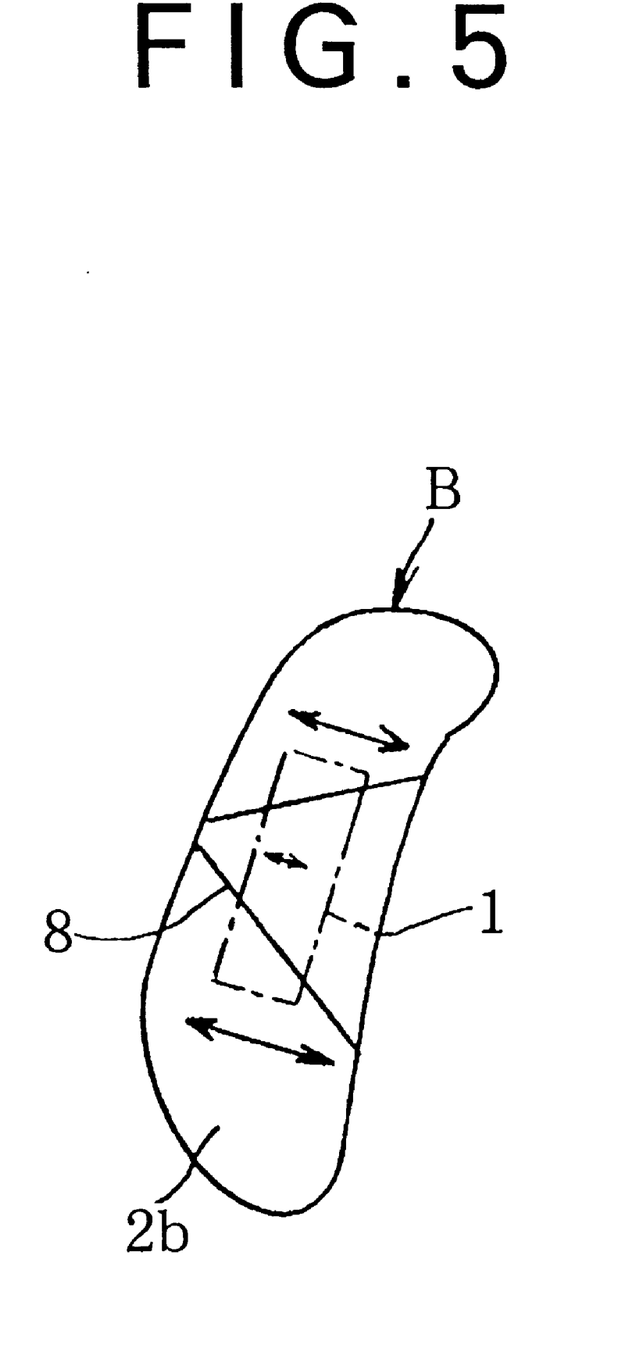
FIG. 5 is an explanatory drawing showing the elongation of the trim cover at the initial inflation of the air bag in the automotive seat.
Figure 6:
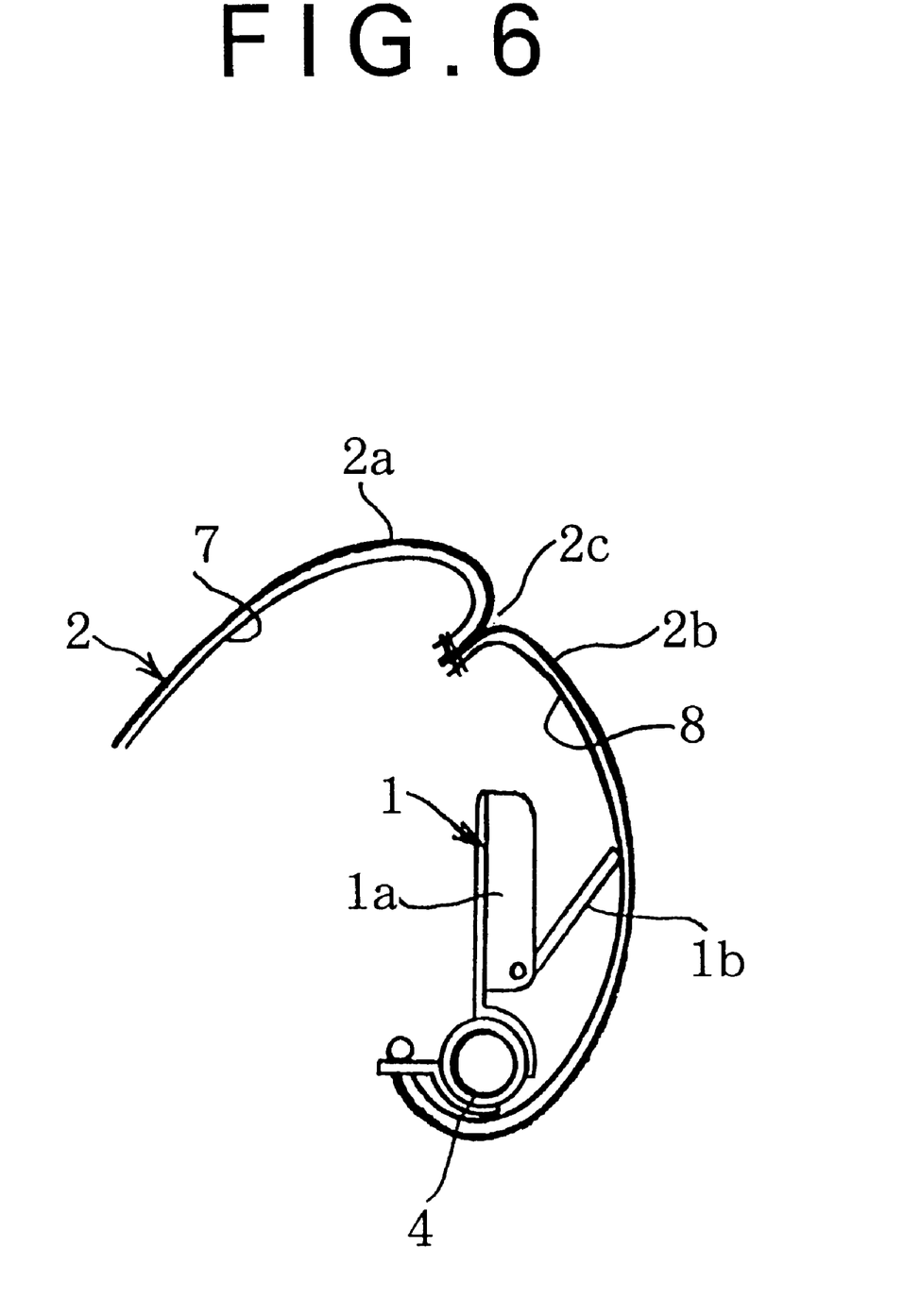
FIG. 6 is an explanatory drawing showing the elongation of the trim cover at the initial inflation of the air bag as in FIG. 5.

Then, the air bag inflates partially out of the case lid 1b and pushes, from inside, the nearby wide areas, not covered by the stay cloths 7 and 8, of the front side and lateral portions 2a and 2b located on either side, respectively, of the seam line 2c. When thus applied with the expansion pressure of the inflated air bag, the wide areas of the front side and lateral portions 2a and 2b will be elongated as shown in FIGS. 5 and 6. Since the sewing threads, cut at one or some places, are pulled by the front side and lateral portions 2a and 2b which will thus be unthreaded continuously along the seam line 2c. Hence, even with a low output from the inflator, the ends of the front side and lateral portions 2a and 2b can be quickly and positively separated along the seam line 2c.

The stay cloths 7 and 8 are made of a material which will be less elongated even when applied with the stress, and the areas of the front side and lateral portions 2a and 2b of the trim cover 2 not covered by the stay cloths 7 and 8, respectively, are elongated at a fixed ratio, if any. Therefore, the ratios of length and width between the front side and lateral portions 2a and 2b remain unchanged. Thus, the air bag can be inflated and expanded evenly in a predetermined direction.

Note that the bulged portion of the back pad 5 is designed to maintain its shape even when applied with the tension of the stay cloths 7 and 8. For more positively preventing the bulged portion of the back pad 5 from being deformed by compression, the bulged portion may be formed from a more rigid material.

Figure 7:
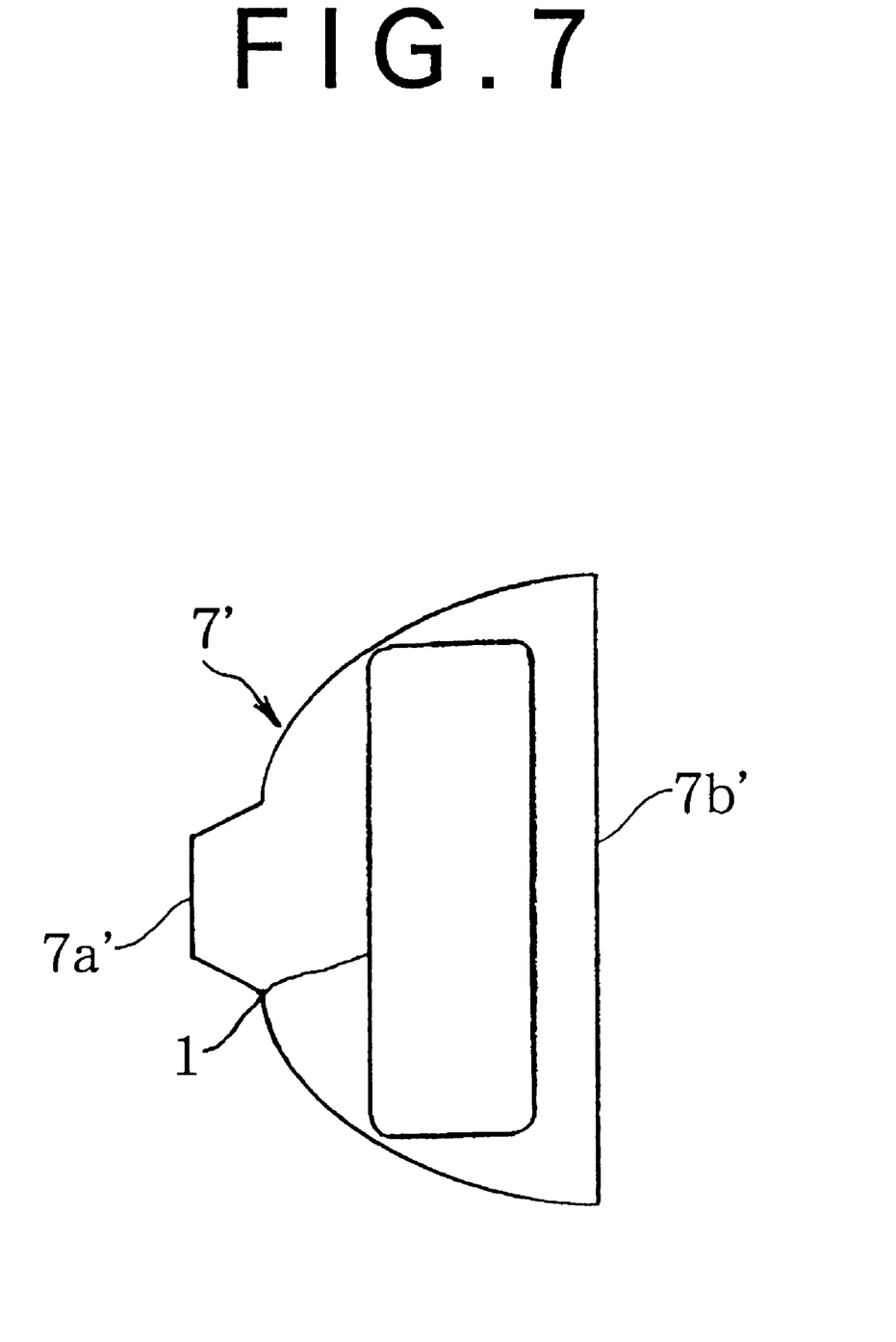
FIG. 7 is a plan view of a variant of the stay cloth provided in the automotive seat according to the present invention.

The present invention has been described in the foregoing concerning an embodiment in which the stay cloths having the general shape of a trapezoid are employed. It should be noted however that the stay cloth may be a bowl-shaped one 7' of which the side 7a' is shorter than a side 7b' thereof as shown in FIG. 7. In this case, the air bag device 1 can be fully covered by the wide area near the long side 7b' as shown. The aforementioned trapezoidal stay cloth and also the bowl-shaped one 7' should preferably have the short side (7a' in the latter) of about 25 mm. When this length is less than 50 mm, the expansion pressure of the inflated air bag can be instantly concentrated to the seam line.

As having been described in the foregoing, in the automotive seat with the side air bag device the possible elongation caused by the expansion pressure of the inflated air bag, of the front side and lateral portions of the trim cover can be minimized by the stay cloths and the stress caused by the air bag inflation and expansion can be highly effectively concentrated to the seam line that is the break line along which the trim cover is to be broken.

Thus, the sewing threads are strongly pulled and quickly cut by the stay cloths of which the short sides are sewn together on the front side and lateral portions along the aforementioned predetermined limited portion of the seam line. Starting at such a cut point, the seam line are unthreaded continuously when the trim cover is applied with the expansion pressure of the inflated air bag. Therefore, even with a low output pressure from the inflator, the trim cover can be broken along the seam line, or break line, quickly and positively.

In the automotive seat with the side air bag device, the stay cloths are provided integrally with the trim cover by sewing or laminating them to the inner surface of the trim cover. Namely, the stay cloths can easily be provided integrally with the seam line, or break line, along which the trim cover can be quickly and positively broken when applied with the expansion pressure of the inflated air bag.

The terms and expressions which have been employed herein are used as terms of description, not of limitation. There is no intention in the use of such terms and expressions of excluding any equivalents of the features shown and described or portions thereof. However, it is recognized that various modifications are possible within the scope of the invention claimed.

What is claimed is:

1. An automotive seat comprising a seat back having a seat back frame and a trim cover and a side air bag device comprising an inflator and an air bag adapted to be inflated and to expand out of said seat when supplied with an output pressure from said inflator, said side air bag device being disposed at one side of said seat back frame, wherein:

said trim cover comprises a front portion and a lateral portion that cover the side of the seat back frame where said side air bag device is located, said front portion having an edge and said lateral portion having an edge, said front and lateral portions being joined at their respective edges along a seam line therebetween such that said front portion and said lateral portion are separable when said air bag is inflated and expanded;

said trim cover further comprising:

a first stay cloth attached to an inner surface of said front portion, said first stay cloth having a first edge adjacent the seam line and a second edge operatively connected to the seat back frame, said first edge being opposite from and substantially shorter than said second edge; and a second stay cloth attached to an inner surface of said lateral portion, said second stay cloth having a first edge adjacent the seam line and a second edge operatively connected to the seat back frame, said first edge being opposite from and substantially shorter than said second edge;

said first and second stay cloths being formed of a material that is substantially less deformable than said front and lateral portions of said trim cover when subjected to expansion pressure caused by inflation of said air bag.

2. The automotive seat as set forth in claim 1, wherein said first and second stay cloths are provided integrally with said trim cover by sewing or laminating said first and second stay cloths to said inner surface of said trim cover.

3. The automotive seat as set forth in claim 1, wherein the first and second stay cloths are substantially trapezoidal in shape.

4. The automotive seat as set forth in claim 1, wherein the first and second edges of the first stay cloth are substantially parallel to each other and the first and second edges of the second stay cloth are substantially parallel to each other.

5. The automotive seat as set forth in claim 4 wherein the first stay cloth has a pair of non-parallel edges disposed between the first and second edges thereof and the second stay cloth has a pair of non-parallel edges disposed between the first and second edges thereof.

6. The automotive seat as set forth in claim 5 wherein the non-parallel edges of the first stay cloth are curved convexly relative to each other.

7. The automotive seat as set forth in claim 6 wherein the non-parallel edges of the second stay cloth are curved convexly relative to each other.

8. The automotive seat as set forth in claim 5, wherein the non-parallel edges of the first stay cloth are curved concavely relative to each other.

9. The automotive seat as set forth in claim 8, wherein the non-parallel edges of the second stay cloth are curved concavely relative to each other.

* * * * *